US011189307B1

(12) United States Patent
Torres et al.

(10) Patent No.: US 11,189,307 B1
(45) Date of Patent: Nov. 30, 2021

(54) BASE APPARATUS AND METHODS FOR HEAD ASSEMBLIES OF MAGNETIC STORAGE DEVICES

(71) Applicant: Western Digital Technologies, Inc., San Jose, CA (US)

(72) Inventors: Eduardo Torres, San Jose, CA (US); Oscar Ruiz, San Jose, CA (US); Kenji Kuroki, Fujisawa (JP)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 0 days.

(21) Appl. No.: 16/883,894

(22) Filed: May 26, 2020

(51) Int. Cl.
*G11B 5/29* (2006.01)
*G11B 5/48* (2006.01)
*G11B 5/008* (2006.01)
*G11B 5/02* (2006.01)

(52) U.S. Cl.
CPC ........ *G11B 5/4893* (2013.01); *G11B 5/00813* (2013.01); *G11B 5/02* (2013.01)

(58) Field of Classification Search
None
See application file for complete search history.

(56) References Cited

U.S. PATENT DOCUMENTS

| | | | | |
|---|---|---|---|---|
| 3,521,006 A | * | 7/1970 | Michael | G11B 5/10 360/129 |
| 4,193,103 A | * | 3/1980 | Fesler | G11B 5/187 360/122 |
| 4,683,507 A | * | 7/1987 | Roberts | G11B 5/56 360/291.3 |
| 5,055,956 A | * | 10/1991 | Kaya | G11B 15/62 360/291.3 |
| 5,471,355 A | * | 11/1995 | Ogata | G11B 5/09 360/84 |
| 6,014,291 A | * | 1/2000 | Watanabe | G11B 5/115 360/121 |
| 6,118,623 A | * | 9/2000 | Fatula, Jr. | G11B 5/3903 360/313 |

(Continued)

OTHER PUBLICATIONS

"IBM TS3100 and TS3200 tape library models with LTO Ultrium 8 drives deliver increased capacity", IBM, Oct. 10, 2017, pp. 1-11.

*Primary Examiner* — Peter Vincent Agustin
(74) *Attorney, Agent, or Firm* — Patterson & Sheridan, LLP; Steven H. Versteeg

(57) ABSTRACT

Aspects of the present disclosure generally relate to a base and related methods for write and read heads. In one example, the base and related methods are used as part of a magnetic storage device, for example a magnetic media drive such as a hard disk drive (HDD) or a magnetic tape drive (e.g., a tape embedded drive). The base includes one or more base bodies formed of a ceramic material. Each base body includes an inward surface, an outward surface opposing the inward surface, a lower surface, and an angled upper surface disposed above the lower surface. Each base body includes a vertical opening extending between the upper surface and the lower surface. In one example, two base bodies are bonded together. In one example, the two base bodies combine to form a single base body of the base that is monolithic and unitary.

29 Claims, 11 Drawing Sheets

(56) References Cited

U.S. PATENT DOCUMENTS

| | | | |
|---|---|---|---|
| 6,172,857 B1 * | 1/2001 | Inaguma | G11B 5/53 360/271 |
| 6,288,870 B1 * | 9/2001 | Saliba | G11B 5/1871 360/121 |
| 7,486,464 B2 | 2/2009 | Saliba | |
| 8,564,902 B2 | 10/2013 | Biskeborn et al. | |
| 8,804,270 B2 | 8/2014 | Hamidi et al. | |
| 9,001,462 B2 | 4/2015 | Biskeborn et al. | |
| 9,484,056 B2 | 11/2016 | Biskeborn et al. | |
| 10,991,390 B2 * | 4/2021 | Kobayashi | G11B 33/14 |
| 2005/0105220 A1 * | 5/2005 | Iben | G11B 33/1493 360/323 |
| 2005/0201017 A1 | 9/2005 | Koga et al. | |
| 2015/0199981 A1 | 7/2015 | Torline | |
| 2020/0258544 A1 * | 8/2020 | Kobayashi | G11B 5/4893 |

* cited by examiner

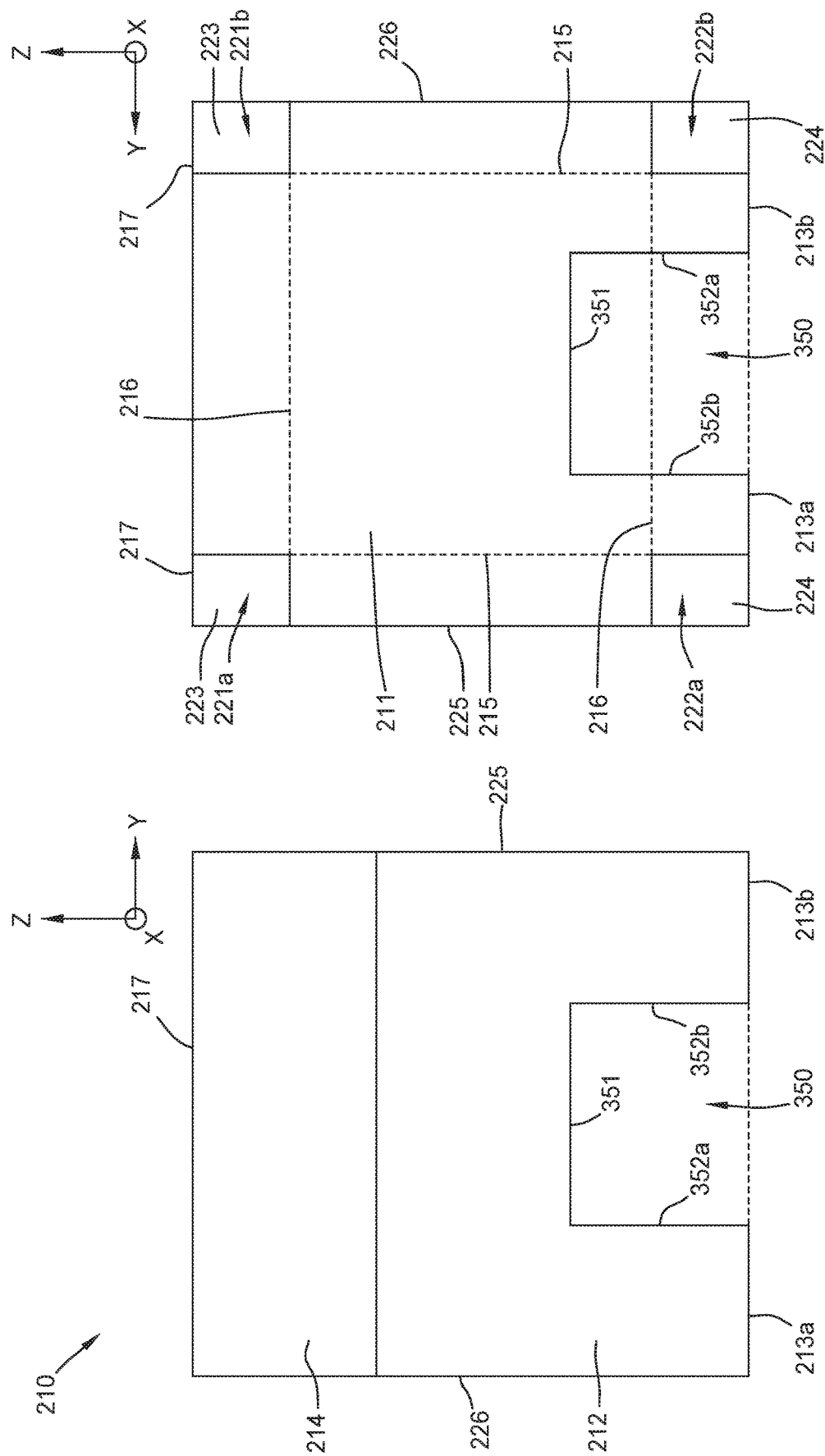

BASE APPARATUS AND METHODS FOR HEAD ASSEMBLIES OF MAGNETIC STORAGE DEVICES

BACKGROUND OF THE DISCLOSURE

Field of the Disclosure

Aspects of the present disclosure generally relate to a base and related methods for write and read heads. In one example, the base and related methods are used as part of a magnetic storage device, for example a magnetic media drive such as a hard disk drive (HDD) or a magnetic tape drive (e.g., a tape embedded drive).

Description of the Related Art

Tape data storage is a system for storing digital information on magnetic tape using digital recording. Tape storage media is more commonly packaged in cartridges and cassettes. A tape drive performs writing or reading of data in the cartridges or cassettes. A common cassette-based format is LTO, which comes in a variety of densities.

Tape drives operate by using a tape head to record and read back information from tapes by magnetic processes. The tape head can have servo elements and data elements that are arranged in an array that is oftentimes referred to as a tape head array.

In operation, the tape may stretch and move and thus not properly align with the tape head during read and/or write operations. Furthermore, the track spacing between adjacent data tracks can be different due to the stretching and/or moving of the tape. Coupling processes and spatial constraints can also limit tape head arrangements across applications.

Therefore, there is a need in the art for bases and related methods that facilitate control of track pitch and are modular in applications across tape head arrangements, wires processes, and coupling processes.

SUMMARY OF THE DISCLOSURE

Aspects of the present disclosure generally relate to a base and related methods for write and read heads. In one example, the base and related methods are used as part of a magnetic storage device, for example a magnetic media drive such as a hard disk drive (HDD) or a magnetic tape drive (e.g., a tape embedded drive). The base includes one or more base bodies formed of a ceramic material. Each base body includes an inward surface, an outward surface opposing the inward surface, a lower surface, and an angled upper surface disposed above the lower surface. Each base body includes a vertical opening extending between the upper surface and the lower surface. In one example, two base bodies are bonded together. In one example, the two base bodies combine to form a single base body of the base that is monolithic and unitary.

In one implementation, a base for write and read heads of magnetic drives includes a base body formed of a ceramic material. The base body includes an inward surface, an outward surface opposing the inward surface, a lower surface, and an angled upper surface disposed above the lower surface.

In one implementation, a base for write and read heads of magnetic drives includes a base body formed of a ceramic material. The base body includes an upper surface, a lower surface opposing the upper surface, and a vertical opening extending between the upper surface and the lower surface. The base body also includes an inward surface defined at least partially by the vertical opening, an outward surface opposing the inward surface, and a plurality of legs that protrude from the inward surface in a direction from the outward surface and to the inward surface.

In one implementation, a storage device includes an enclosure including a plurality of walls. The storage device also includes a first motor disposed in the enclosure, a second motor disposed in the enclosure, and a head assembly disposed in the enclosure. The head assembly includes a base. The base includes a first inward surface, a first outward surface opposing the first inward surface, a first lower surface, and a first angled upper surface disposed above the first lower surface. The base also includes a second inward surface, a second outward surface opposing the second inward surface, and a second angled upper surface.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIG. 3E illustrates a schematic back view of the first base body illustrated in FIG. 3A, according to one implementation.

FIG. 3F illustrates a schematic front view of the first base body illustrated in FIG. 3A, according to one implementation.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

Aspects of the present disclosure generally relate to a base and related methods for write and read heads. In one example, the base and related methods are used as part of a magnetic storage device, for example a magnetic media drive such as a hard disk drive (HDD) or a magnetic tape drive (e.g., a tape embedded drive). The base includes one or more base bodies formed of a ceramic material. Each base body includes an inward surface, an outward surface opposing the inward surface, a lower surface, and an angled upper surface disposed above the lower surface. Each base body includes a vertical opening extending between the upper surface and the lower surface. In one example, two base bodies are bonded together. In one example, the two base bodies combine to form a single base body of the base that is monolithic and unitary.

Figure 1A:
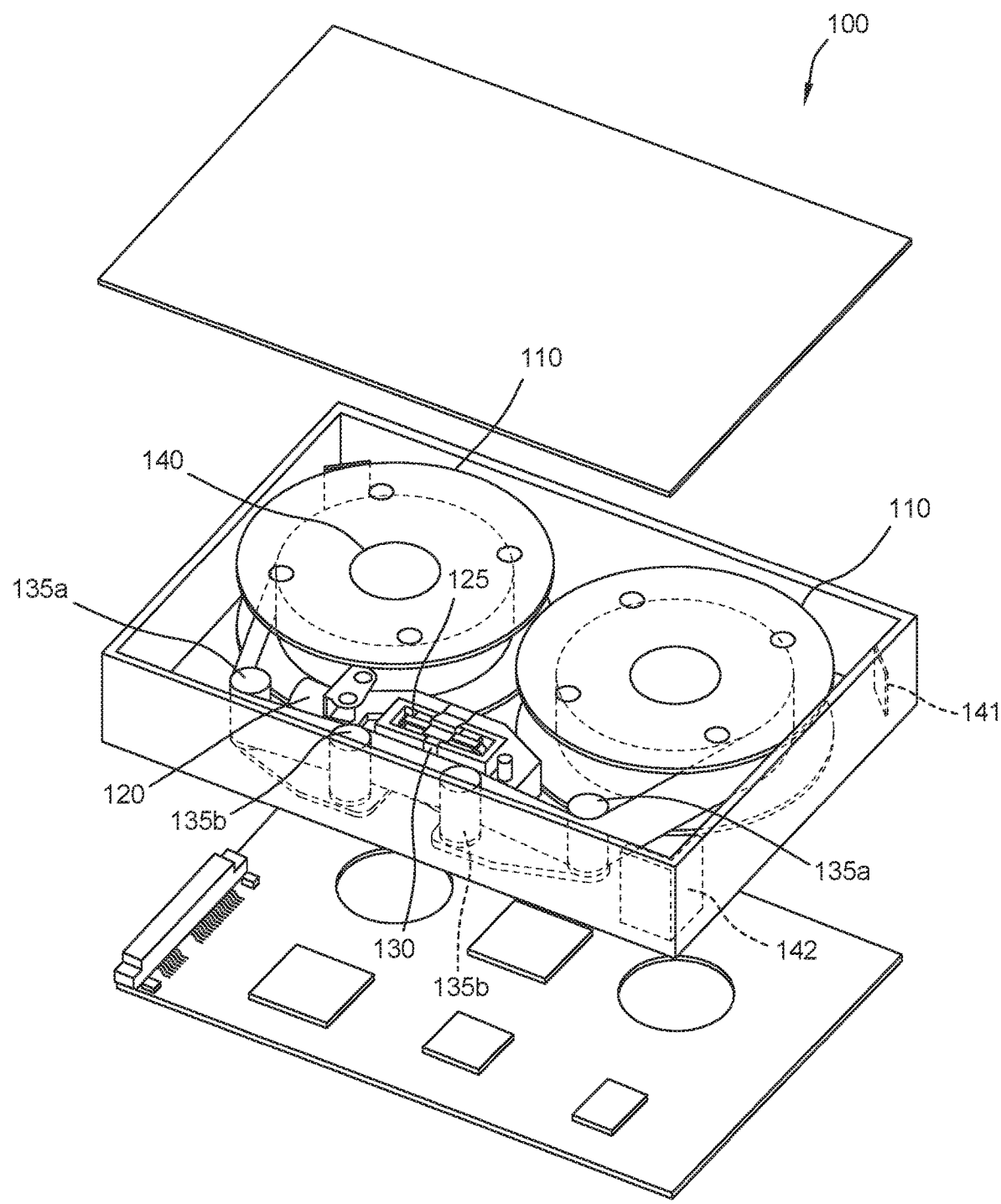
FIG. 1A illustrates a schematic perspective exploded view of a storage device, according to one implementation.

FIG. 1A illustrates a schematic perspective exploded view of a storage device 100, according to one implementation. The storage device 100 is a magnetic media drive, particularly a tape embedded drive. The storage device 100 will be referred to as the tape embedded drive 100 hereafter.

The present disclosure contemplates that aspects of the storage device 100 may also be included on a magnetic disk drive, such as a hard disk drive (HDD). It is to be understood that the magnetic recording head discussed herein is applicable to a data storage device such as a hard disk drive (HDD) as well as a tape drive such as a tape embedded drive (TED) or an insertable tape media drive. An example TED is described in co-pending patent application titled "Tape Embedded Drive," U.S. application Ser. No. 16/365,034, filed Mar. 31, 2019, assigned to the same assignee of this application, which is herein incorporated by reference. As such, any reference in the detailed description to a HDD or tape drive is merely for exemplification purposes and is not intended to limit the disclosure unless explicitly claimed. Furthermore, reference to or claims directed to magnetic recording devices are intended to include both HDD and tape drive unless HDD or tape drive devices are explicitly claimed.

Figure 1B:
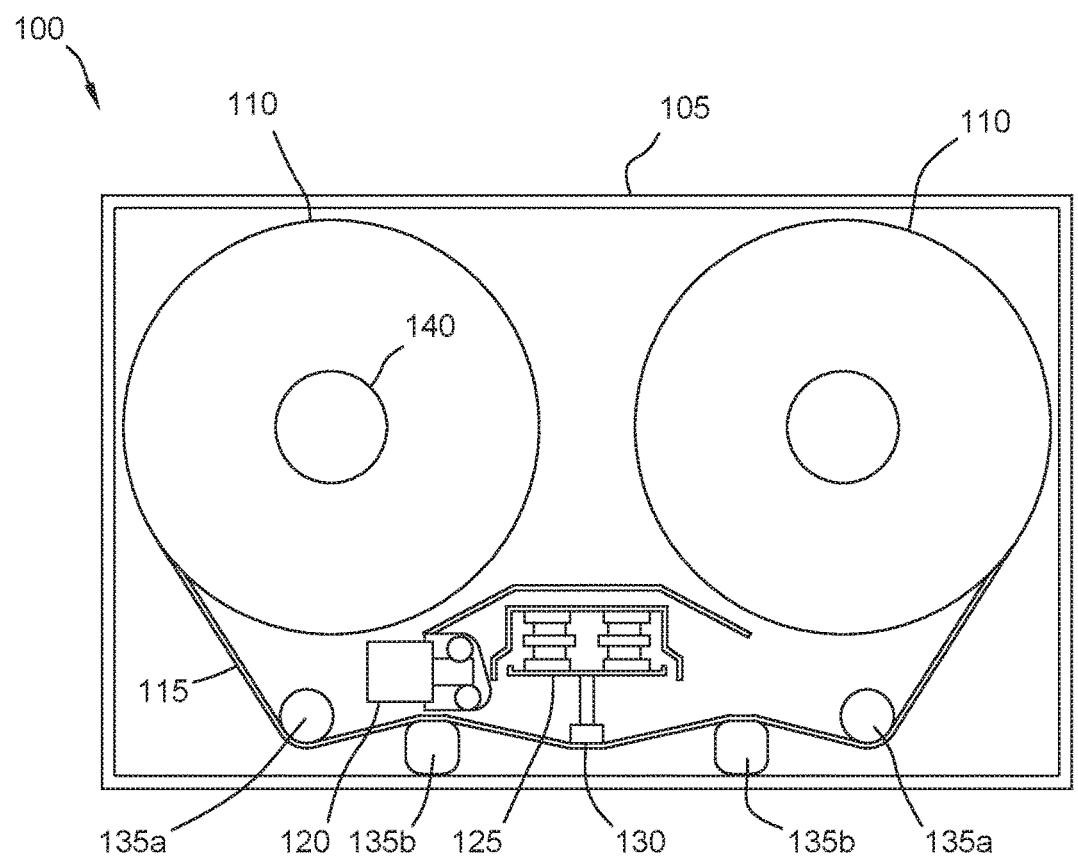
FIG. 1B illustrates a schematic top-down view of the tape embedded drive illustrated in FIG. 1A, according to one implementation.

FIG. 1B illustrates a schematic top-down view of the tape embedded drive 100 illustrated in FIG. 1A, according to one implementation.

Figure 1C:
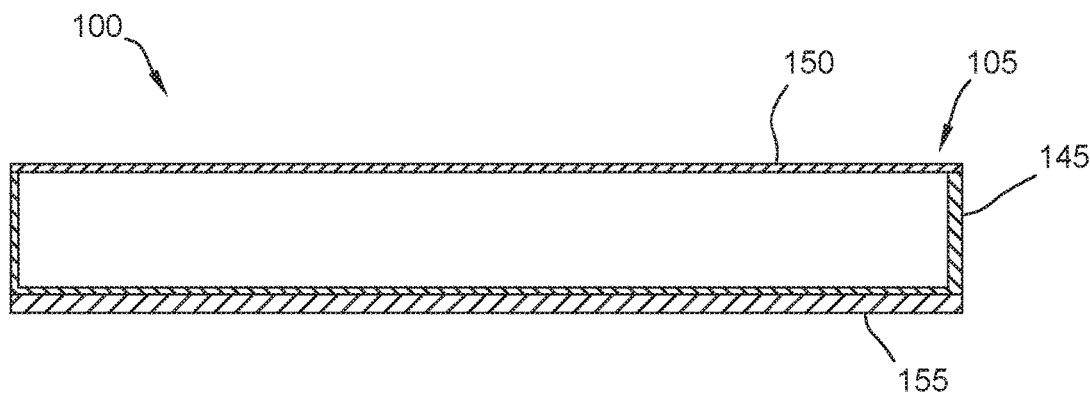
FIG. 1C illustrates a schematic side profile view of the tape embedded drive illustrated in FIG. 1A, according to one implementation.

FIG. 1C illustrates a schematic side profile view of the tape embedded drive 100 illustrated in FIG. 1A, according to one implementation.

Focusing on FIG. 1B, for example, the tape embedded drive 100 includes an enclosure that includes a casing 105, one or more tape reels 110, one or more rotors (e.g., a stepping motor 120 (also known as a stepper motor), a voice coil motor (VCM) 125, a head assembly 130 with one or more read heads and one or more write heads, and tape guides/rollers 135a, 135b. Focusing on FIG. 1C, for example, the tape embedded drive 100 also includes a printed circuit board assembly 155 (PCBA). In one embodiment, which can be combined with other embodiments, most of the components are within an interior cavity of the casing 105, except the PCBA 155, which is mounted on an external surface of the casing 105. The same components are illustrated in a perspective view in FIG. 1A.

In the illustrated implementations, two tape reels 110 are placed in the interior cavity of the casing 105, with a center of each of the two tape reels 110 on the same level in the cavity. As shown in FIGS. 1A and 1B, the head assembly 130 is located between and below the two tape reels 110. Tape reel motors located in the spindles of the tape reels 110 can operate to wind and unwind the tape media 115 into and out of the tape reels 110. Each tape reel 110 may also incorporate a tape folder to help the tape media 115 be neatly wound onto the respective tape reel 110. The tape media 115 may be made via a sputtering process to provide improved areal density. The tape media 115 includes two surfaces, an oxide side and a substrate side. The oxide side is the surface that can be magnetically manipulated (written to or read from) by one or more read/write heads. The substrate side of the tape media 115 aids in the strength and flexibility of the tape media 115.

Tape media 115 from the tape reels 110 are biased against the guides/rollers 135a, 135b (collectively referred to as guides/rollers 135) and are movably passed along the head assembly 130 by movement of the reels. The illustrated embodiment shows four guides/rollers 135a, 135b, with the two guides/rollers 135a furthest away from the head assembly 130 serving to change direction of the tape media 115 and the two guides/rollers 135b closest to the head assembly 130 by pressing the tape media 115 against the head assembly 130.

In one embodiment, which can be combined with other embodiments, the guides/rollers 135 utilize the same structure, as shown in FIG. 1A. In one embodiment, which can be combined with other embodiments, the guides/rollers 135 may have more specialized shapes and differ from each other based on function, as shown in FIG. 1B. A lesser or a greater number of rollers may be used. For example, the two function rollers may be cylindrical in shape, while the two functional guides may be flat-sided (e.g., rectangular prism) or clip shaped with two prongs and the film moving between the prongs of the clip.

The voice coil motor 125 and the stepping motor 120 may variably position the tape head(s) transversely with respect to the width of the recording tape (e.g., the tape media 115). The stepping motor 120 may provide coarse movement, while the voice coil motor 125 may provide finer actuation of the head(s) of the head assembly 130. In one embodiment, which can be combined with other embodiments, servo data may be written to the tape media 115 to aid in more accurate position of the head(s) along the tape media 115.

The casing 105 includes one or more particle filters 141 and/or desiccants 142, as illustrated in FIG. 1A, to help maintain the environment in the casing 105. For example, if the casing 105 is not airtight, the particle filters 141 may be placed where airflow is expected. The particle filters 141 and/or desiccants 142 may be placed in one or more of the corners or any other convenient place away from the moving internal components. For example, the moving tape reels 110 may generate internal airflow as the tape media 115 winds/unwinds, and the particle filters 141 may be placed within that airflow.

There is a wide variety of possible placements of the internal components of the tape embedded drive 100 within the casing 105. In particular, as the head assembly 130 is internal to the casing 105 in certain examples, the tape media 115 may not be exposed to the outside of the casing 105. Thus, the tape media 115 does not need to be routed along the edge of the casing 105 and can be freely routed in more compact and/or otherwise more efficient ways within the casing 105. Similarly, the head(s) and tape reels 110 may be placed in a variety of locations to achieve a more efficient layout, as there are no design requirements to provide external access to these components.

As illustrated in FIG. 1C, the casing 105 includes a cover 150 and a base 145. The PCBA 155 is attached to the bottom, on an external surface of the casing 105, opposite the cover 150. The base 145 includes three walls and the cover 150 includes a fourth wall to form four walls of a plurality of walls of the casing 105 that is included in the enclosure of the tape embedded drive 100. As the PCBA 155 is made of solid state electronics, environmental issues are less of a concern, so it does not need to be placed inside the casing 105. That leaves room inside the casing 105 for other components, particularly, the moving components and the tape media 115 that would benefit from a more protected environment.

In one embodiment, which can be combined with other embodiments, the tape embedded drive 100 is sealed. Sealing can mean the tape embedded drive 100 is hermetically sealed or simply enclosed without necessarily being airtight. Sealing the drive may be beneficial for tape film winding stability, tape film reliability, and tape head reliability. Desiccant may be used to limit humidity inside the casing 105.

In one embodiment, which can be combined with other embodiments, the cover 150 is used to hermetically seal the tape embedded drive 100. For example, the tape embedded drive 100 may be hermetically sealed for environmental control by attaching (e.g., laser welding, adhering using adhesive, etc.) the cover 150 to the base 145. The tape embedded drive 100 may be filled by helium, nitrogen, hydrogen, or any other typically inert gas.

In one embodiment, which can be combined with other embodiments, other components may be added to the tape embedded drive 100. For example, a pre-amp for the heads of the head assembly 130 may be added to the tape embedded drive 100. The pre-amp may be located on the PCBA 155, in the head assembly 130, or in another location. In general, placing the pre-amp closer to the heads may have a greater effect on the read and write signals in terms of signal-to-noise ratio (SNR). In one embodiment, which can be combined with other embodiments, some of the components may be omitted. For example, the particle filters 141 and/or the desiccant 142 may be omitted.

Figure 2A:
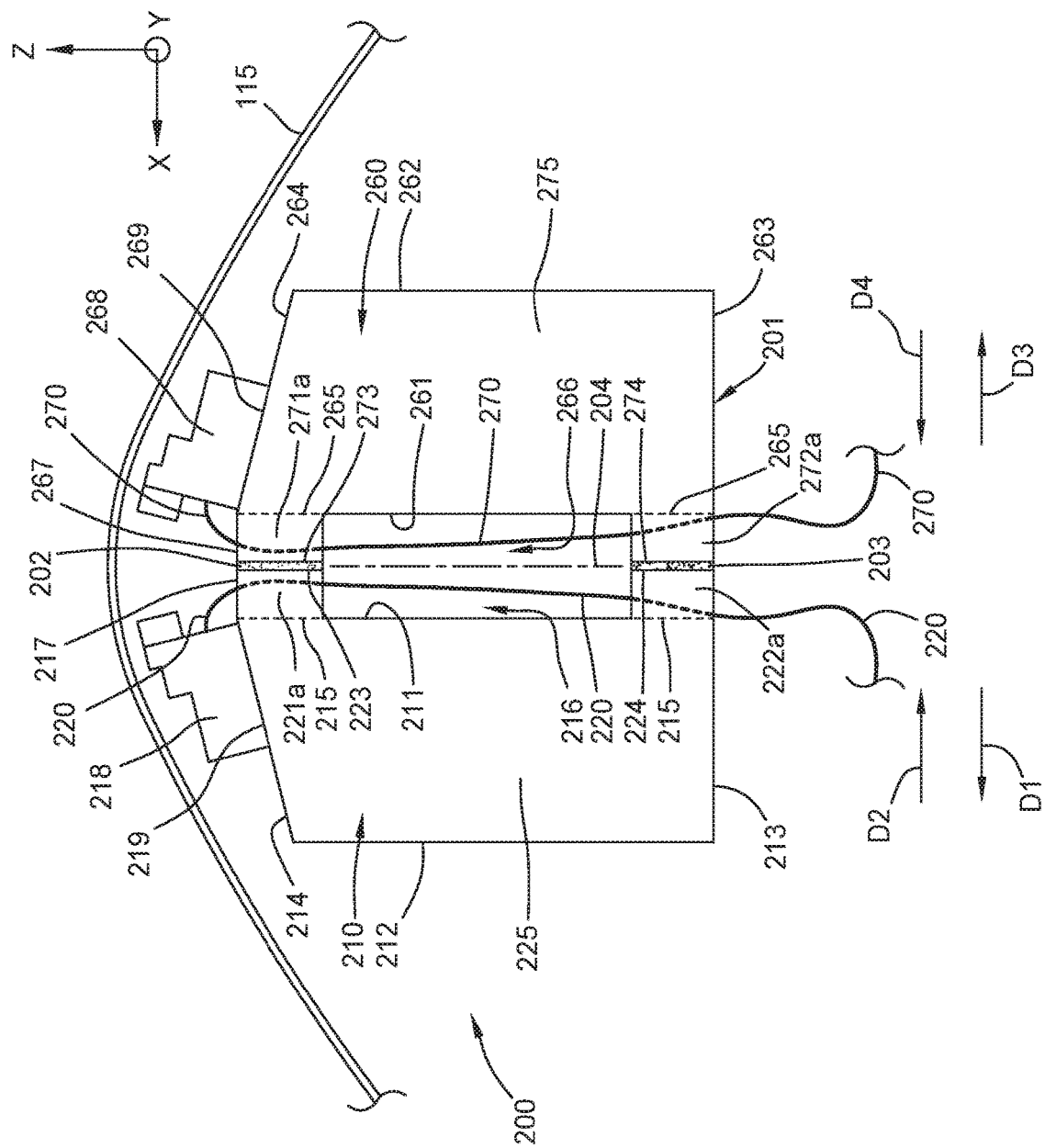
FIG. 2A illustrates a schematic side view of a tape head, according to one implementation.

FIG. 2A illustrates a schematic side view of a tape head 200, according to one implementation. The tape head 200 is used as at least part of a head assembly of a storage device, such as the head assembly 130 of the tape embedded drive 100 illustrated in FIGS. 1A-1C. The tape head 200 includes a base 201. The base 201 includes a first base body 210 and a second base body 260.

The first base body 210 includes a first inward surface 211, a first outward surface 212 that opposes the first inward surface 211, and a first lower surface 213. The first base body 210 also includes a first angled upper surface 214 disposed above the first lower surface 213. The first angled upper surface 214 tapers toward the first lower surface 213 in a direction D1 from the first inward surface 211 to the first outward surface 212.

The first base body 210 also includes a first vertical opening 215 that extends between the first lower surface 213 and an upper surface of the first base body 210. In one embodiment, which can be combined with other embodiments, the first base body 210 includes a first horizontal upper surface 217 that is parallel to the first lower surface 213, as shown in FIG. 2A. In such an embodiment, the first vertical opening 215 extends vertically between the first lower surface 213 and the first horizontal upper surface 217. In one embodiment, which can be combined with other embodiments, the first horizontal upper surface 217 is omitted and the first angled upper surface 214 extends farther to the right in place of the first horizontal upper surface 217. In such an embodiment, the first vertical opening 215 extends vertically between the first lower surface 213 and the first angled upper surface 214. The first base body 210 also includes a horizontal opening 216 that extends horizontally between a first side surface 225 and a second side surface 226 of the first base body 210. The horizontal opening 216 extends along a profile parallel to the Y-axis. The first vertical opening 215 extends along a profile parallel to the Z-axis. The horizontal opening 216 at least partially defines the first inward surface 211. A first leg 221a of the upper set of legs 221a, 221b and a first leg 222a of the lower set of legs 222a, 222b, such as a side surface of each first leg, are at least part of the first side surface 225 of the first base body 210. A second leg 221b (shown in FIG. 2B) of the upper set of legs 221a, 221b and a second leg 222b (shown in FIG. 2H) of the lower set of legs 222a, 222b, such as a side surface of each second leg, are at least part of the second side surface 226 of the first base body 210. The upper set of legs 221a, 221b and the lower set of legs 222a, 222b are disposed on opposing sides of the horizontal opening 216.

The tape head 200 includes a first write and read head 218 mounted to the first angled upper surface 214 in a tilted orientation. In one embodiment, which can be combined with other embodiments, the first write and read head 218 is a mini chip in an LET configuration, such as a chiplet. A lower surface 219 of the first write and read head 218 is bonded to the first angled upper surface 214, such as by using an adhesive, for example a glue. In one embodiment, which can be combined with other embodiments, the adhesive includes an ethyl ester, such as Ethyl cyanoacrylate, and/or any other glue. The first write and read head 218 is mounted to the first angled upper surface 214 in a write-read configuration where a left-hand side is a write side for write operations and a right-side is a read side for read operations. The tape media 115 is moved over the first write and read head 218.

A first plurality of wires 220, such as cabling, are coupled to the first write and read head 218. The first plurality of wires 220 extend vertically through the first vertical opening 215, past the first vertical opening 215 and past the first lower surface 213. The first plurality of wires 220 deliver power to activate the write and read head 218, such as to activate coils of a writer transducer and coils of a read element to facilitate a magnetoresistive (MR) effect that alters a resistance of a material in the presence of a magnetic field. The first plurality of wires 220 may optionally deliver data that is written to the tape media 115 and/or read from the tape media 115.

The first base body 210 also includes an upper set of legs 221a, 221b and a lower set of legs 222a, 222b disposed below the upper set of legs 221a, 221b. The upper set of legs 221a, 221b, such as an upper surface of each upper leg, are at least part of the upper surface of the first base body 210. In an embodiment where the first horizontal upper surface 217 is included, the upper set of legs 221a, 221b are at least part of the first horizontal upper surface 217. In an embodiment where the first horizontal upper surface 217 is omitted, the upper set of legs 221a, 221b are at least part of the first angled upper surface 214. The upper set of legs 221a, 221b and the lower set of legs 222a, 222b protrude from the first inward surface 211 in a direction D2 from the first outward surface 212 to the first inward surface 211.

The second base body 260 of the base 201 includes a second inward surface 261, a second outward surface 262 that opposes the second inward surface 261, and a second lower surface 263. The second base body 260 also includes a second angled upper surface 264 disposed above the second lower surface 263. The second angled upper surface 264 tapers toward the second lower surface 263 in a direction D3 from the second inward surface 261 to the second outward surface 262.

The second base body 260 also includes a second vertical opening 265 that extends between the second lower surface 263 and an upper surface of the second base body 260. In one embodiment, which can be combined with other embodiments, the second base body 260 includes a second horizontal upper surface 267 that is parallel to the second lower surface 263, as shown in FIG. 2A. In such an embodiment, the second vertical opening 265 extends vertically between the second lower surface 263 and the second horizontal upper surface 267. In one embodiment, which can be combined with other embodiments, the second horizontal upper surface 267 is omitted and the second angled upper surface 264 extends farther to the left in place of the second horizontal upper surface 267. In such an embodiment, the second vertical opening 265 extends vertically between the second lower surface 263 and the second angled upper surface 264. The second base body 260 also includes a horizontal opening 266 that extends horizontally between a first side surface 275 and a second side surface 276 (not shown in FIG. 2A) of the second base body 260. The horizontal opening 266 extends along a profile parallel to the Y-axis. The second vertical opening 265 extends along a profile parallel to the Z-axis. The horizontal opening 266 at least partially defines the second inward surface 261. A first leg 271a of the upper set of legs 271a, 271b and a first leg 272a of the lower set of legs 272a, 272b, such as a side surface of each first leg, are at least part of the first side surface 275 of the second base body 260. A second leg 271b (shown in FIG. 2B) of the upper set of legs 271a, 271b and a second leg 272b (not shown in FIG. 2A) of the lower set of legs 272a, 272b, such as a side surface of each second leg, are at least part of the second side surface 276 of the second base body 260. The upper set of legs 271a, 271b and the lower set of legs 272a, 272b are disposed on opposing sides of the horizontal opening 266.

The tape head 200 includes a second write and read head 268 mounted to the second angled upper surface 264 in a tilted orientation. In one embodiment, which can be combined with other embodiments, the second write and read head 268 is a mini chip in an LET configuration, such as a chiplet. A lower surface 269 of the second write and read head 268 is bonded to the second angled upper surface 264, such as by using an adhesive, for example a glue. The second write and read head 268 is mounted to the second angled upper surface 264 in a read-write configuration where a left-hand side is a read side for read operations and a right-side is a write side for write operations. The tape media 115 is moved over the second write and read head 268. The first write and read head 218 in the write-read configuration and the second write and read head 268 in the read-write configuration establish a write-read-read-write configuration for the tape head 200.

A second plurality of wires 270, such as cabling, are coupled to the second write and read head 268. The second plurality of wires 270 extend vertically through the second vertical opening 265, past the second vertical opening 265 and past the second lower surface 263. The second plurality of wires 270 deliver power to activate the second write and read head 268, such as to activate coils of a writer transducer and coils of a read element to facilitate a magnetoresistive (MR) effect that alters a resistance of a material in the presence of a magnetic field. The second plurality of wires 270 may optionally deliver data that is written to the tape media 115 and/or read from the tape media 115.

The second base body 260 also includes an upper set of legs 271a, 271b and a lower set of legs 272a, 272b disposed below the upper set of legs 271a, 271b. The upper set of legs 271a, 271b, such as an upper surface of each upper leg, are at least part of the upper surface of the second base body 260. In an embodiment where the second horizontal upper surface 267 is included, the upper set of legs 271a, 271b are at least part of the second horizontal upper surface 267. In an embodiment where the second horizontal upper surface 267 is omitted, the upper set of legs 271a, 271b are at least part of the second angled upper surface 264. The upper set of legs 271a, 271b and the lower set of legs 272a, 272b protrude from the second inward surface 261 in a direction D4 from the second outward surface 262 to the second inward surface 261.

A plane 204 extends horizontally and vertically, and is parallel to the Y-Z plane. The plane 204 extending vertically is between and divides the first vertical opening 215 and the second vertical opening 265. The first vertical opening 215 and the second vertical opening 265 combine to form a central vertical opening of the base 201 extending vertically through the base 201 and along a profile parallel to the Z-axis. The plane 204 extending horizontally is between and divides the horizontal opening 216 and the horizontal opening 266. The horizontal opening 216 and the horizontal opening 266 combine to form a central horizontal opening of the base 201 extending horizontally through the base 201 and along a profile parallel to the Y-axis.

In one embodiment, which can be combined with other embodiments, the first base body 210 and the second base body 260 are bonded together, for example using an adhesive such as a glue. In such an embodiment, the upper set of legs 221a, 221b of the first base body 210 are bonded to the upper set of legs 271a, 271b of the second base body 260, and the lower set of legs 222a, 222b of the first base body 210 are bonded to the lower set of legs 272a, 272b of the second base body 260. In one example, which can be combined with other examples, inward interface surfaces 223 of the upper set of legs 221a, 221b are bonded to inward interface surfaces 273 of the upper set of legs 271a, 271b, and inward interface surfaces 224 of the lower set of legs 222a, 222b are bonded to inward interface surfaces 274 of the lower set of legs 272a, 272b. A bonding material 202, such as an adhesive (for example a glue), is disposed between the inward interface surfaces 223 and the inward interface surfaces 273. A bonding material 203, such as an adhesive (for example a glue), is disposed between the inward interface surfaces 224 and the inward interface surfaces 274. In one embodiment, which can be combined with other embodiments, one or more of the bonding material 202 and/or the bonding material 203 include an epoxy.

Using the first base body 210 and the second base body 260 bonded together facilitates operational benefits such as modularity and track pitch control, and also facilitates decreased manufacturing costs and ease of manufacturing.

In one embodiment, which can be combined with other embodiments, the first base body 210 and the second base body 260 are combined to form a single base body of the base 201. The single base body is a monolithic and unitary body of the base 201.

In such an embodiment where the first base body 210 and the second base body 260 are combined to form a single base body of the base 201, one or more aspects, components, features, and/or properties of the first base body 210 and the second base body 260 are combined. As an example, the bonding materials 202, 203 are omitted and the upper set of legs 221a, 221b are combined with the upper set of legs 271a, 271b to form two upper legs extending between the first inward surface 211 and the second inward surface 261. The lower set of legs 222a, 222b are also combined with the lower set of legs 272a, 272b to form two lower legs extending between the first inwards surface 211 and the second inward surface 261. The first horizontal upper surface 217 (if used) and the second horizontal upper surface 267 (if used) may be combined into a single upper horizontal surface of the base 201. The first side surface 225 may be combined with the first side surface 275 to form a single first side surface of the base 201. The second side surface 226 may also be combined with the second side surface 276 to form a single second side surface of the base 201. The first lower surface 213 and the second lower surface 263 may be combined to form a single lower surface of the base 201.

The first base body 210 and the second base body 260, or the single base body of the base 201, are formed of a conductive material, such as a ceramic material. In one embodiment, which can be combined with other embodiments, the ceramic material includes an oxide that includes a metal. In one example, which can be combined with other examples, the ceramic material includes aluminum. In one embodiment, which can be combined with other embodiments, the ceramic material includes aluminum oxide ($Al_2O_3$).

The base 201, such as the first and second base bodies 210, 260 or the single base body, can make up a beam.

In one embodiment, which can be combined with other embodiments, a method of making a write and read head for a magnetic drive is disclosed. The method includes separately forming the first base body 210 and the second base body 260, each of which respectively includes the first angled upper surface 214 and the second angled upper surface 264. The method also includes bonding the first base body 210 to the second base body 260, such as by using the bonding materials 202, 203. The method also includes mounting the first write and read head 218 to the first angled upper surface 214 and mounting the second write and read head 268 to the second angled upper surface 264, and extending the first and second pluralities of wires 220, 270 through the first and second base bodies 210, 260.

Figure 2B:
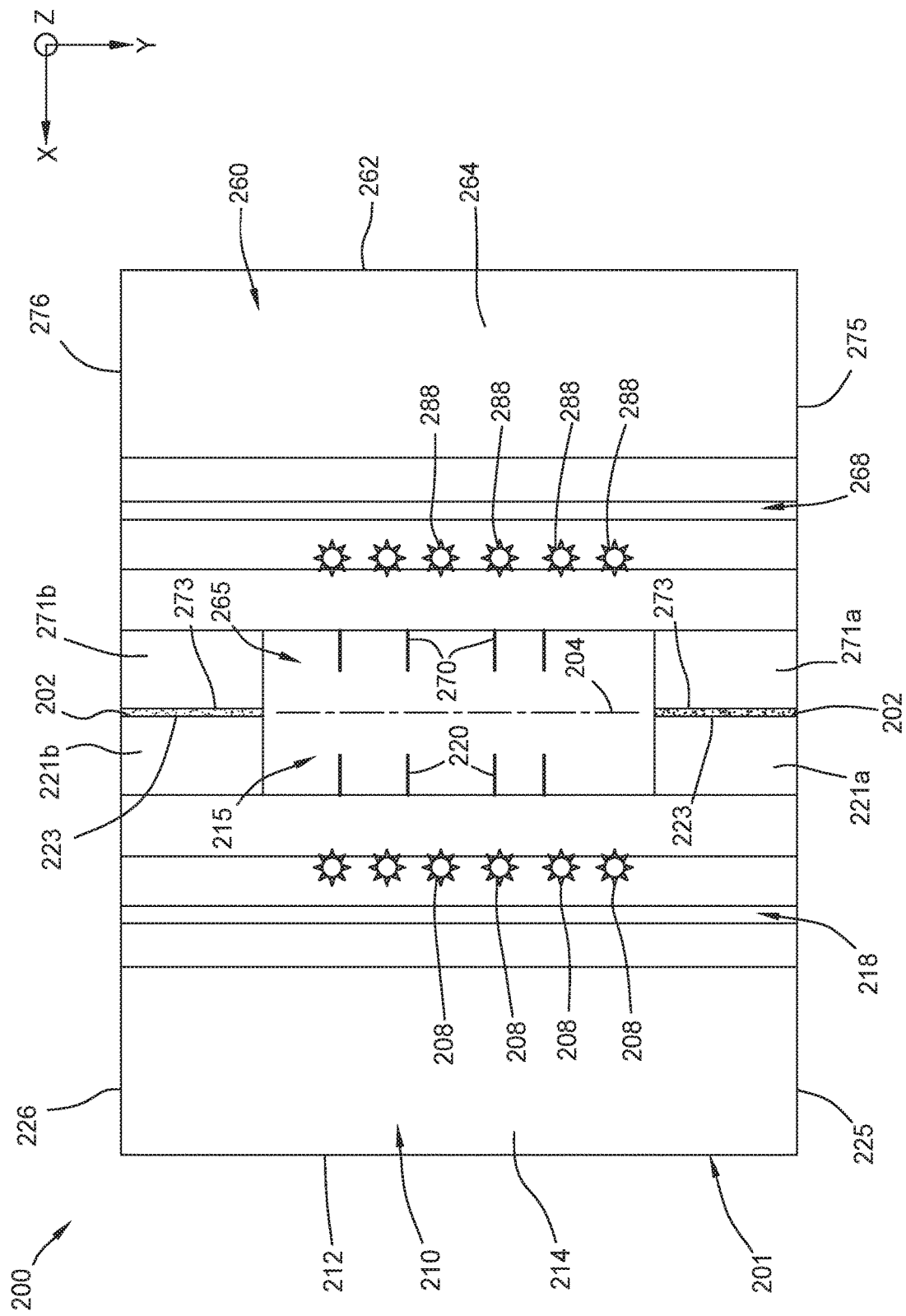
FIG. 2B illustrates a schematic top view of the tape head illustrated in FIG. 2A, according to one implementation.

FIG. 2B illustrates a schematic top view of the tape head 200 illustrated in FIG. 2A, according to one implementation. The upper set of legs 221a, 221b include two legs (the first leg 221a and the second leg 221b) disposed on opposing sides of the first vertical opening 215. The upper set of legs 271a, 271b include two legs (the first leg 271a and the second leg 271b) disposed on opposing sides of the second vertical opening 265. The lower set of legs 222a, 222b (not shown in this view) include two legs (the first leg 222a and the second leg 222b) disposed on opposing sides of the first vertical opening 215. The lower set of legs 272a, 272b (not shown in this view) include two legs (the first leg 272a and the second leg 272b) disposed on opposing sides of the second vertical opening 265.

The first plurality of wires 220 includes at least four wires. The first plurality of wires 220 extend vertically through the first vertical opening 215 and between the first legs 221a, 222a and the second legs 221b, 222b. The second plurality of wires 270 includes at least four wires. The second plurality of wires 270 extend vertically through the second vertical opening 265 and between the first legs 271a, 272a and the second legs 271b, 272b. The first plurality of wires 220 and the second plurality of wires 270 may connect to read elements, write elements, and/or servo elements of the first and second write and read heads 218, 268. The first and second pluralities of wires 220, 270 may include, be part of, or be coupled to circuit lines and/or feedthrough connectors.

The first write and read head 218 includes a plurality of elements 208 disposed thereon. The second write and read head 268 includes a plurality of elements 288 disposed thereon. Each set of elements 208, 288 includes one or more read elements, one or more write elements, and/or one or more servo elements. The first plurality of wires 220 are coupled to one or more of the elements 208 and the second plurality of wires 270 are coupled to one or more of the elements 288.

Figure 2C:
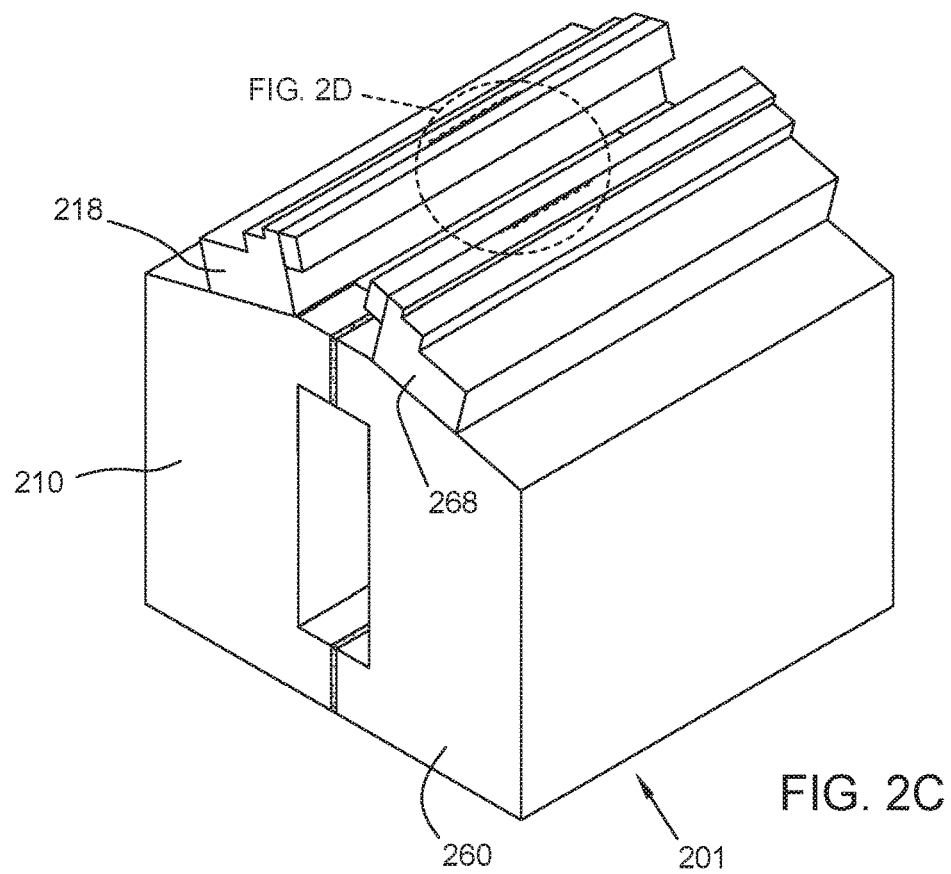
FIG. 2C is a schematic perspective illustration of the tape head illustrated in FIG. 2A, according to one implementation.
Figure 2D:
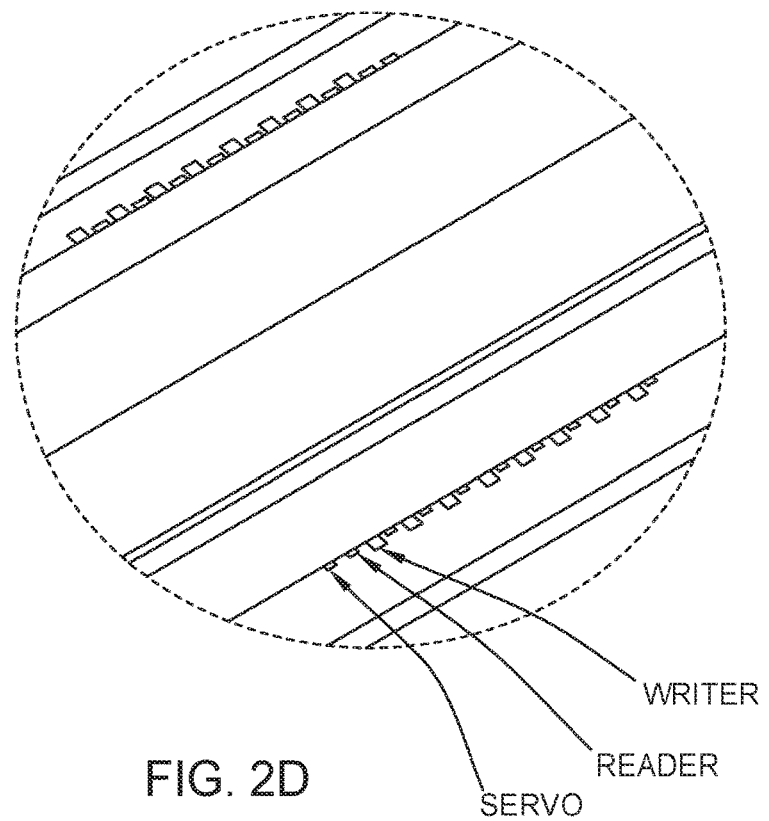
FIG. 2D illustrates a partially enlarged view of the tape head illustrated in FIG. 2C, according to one implementation.

FIG. 2C is a schematic perspective illustration of the tape head 200 illustrated in FIG. 2A, according to one implementation. FIG. 2D illustrates a partially enlarged view of the tape head 200 illustrated in FIG. 2C, according to one implementation. The first and second write and read heads 218, 268 each includes a plurality of read head elements, a plurality of write head elements, and one or more servo read elements. The tape head 200 may include about 32 or more data read/write head elements and about 2 servo read elements distributed across the first and second write and read heads 218, 268 (e.g., chiplets). The previously listed values are not intended to be limiting, but to provide an example of a possible embodiment. The plurality of tape head elements as well as the plurality of components on the PCBA, such as the PCBA 155 of FIG. 1C, may require a plurality of circuit lines. The configuration of the plurality of circuit lines may require a plurality of feedthrough connectors, such that the circuit lines does not overload or exceed the capacity of a feedthrough connector. In one embodiment, the plurality of feedthrough connectors comprises three feedthrough connectors. In another embodiment, the plurality of feedthrough connectors comprises four feed through connectors.

Figure 2F:
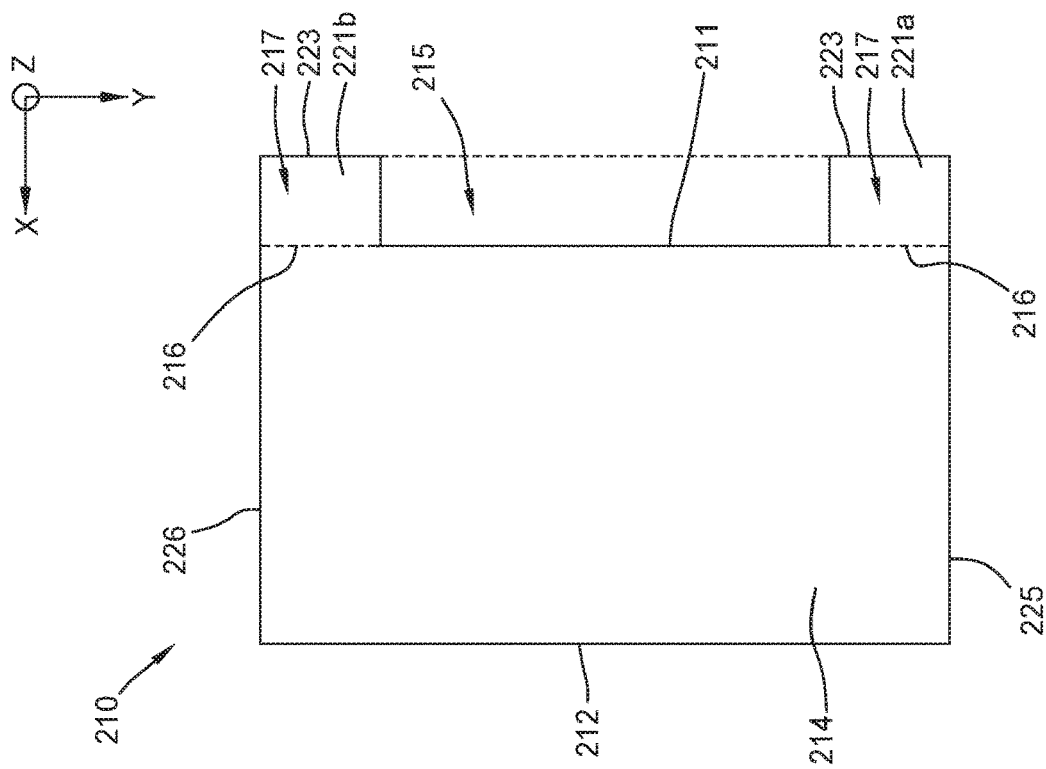
FIG. 2F illustrates a schematic top view of the first base body illustrated in FIG. 2A, according to one implementation.
Figure 2E:
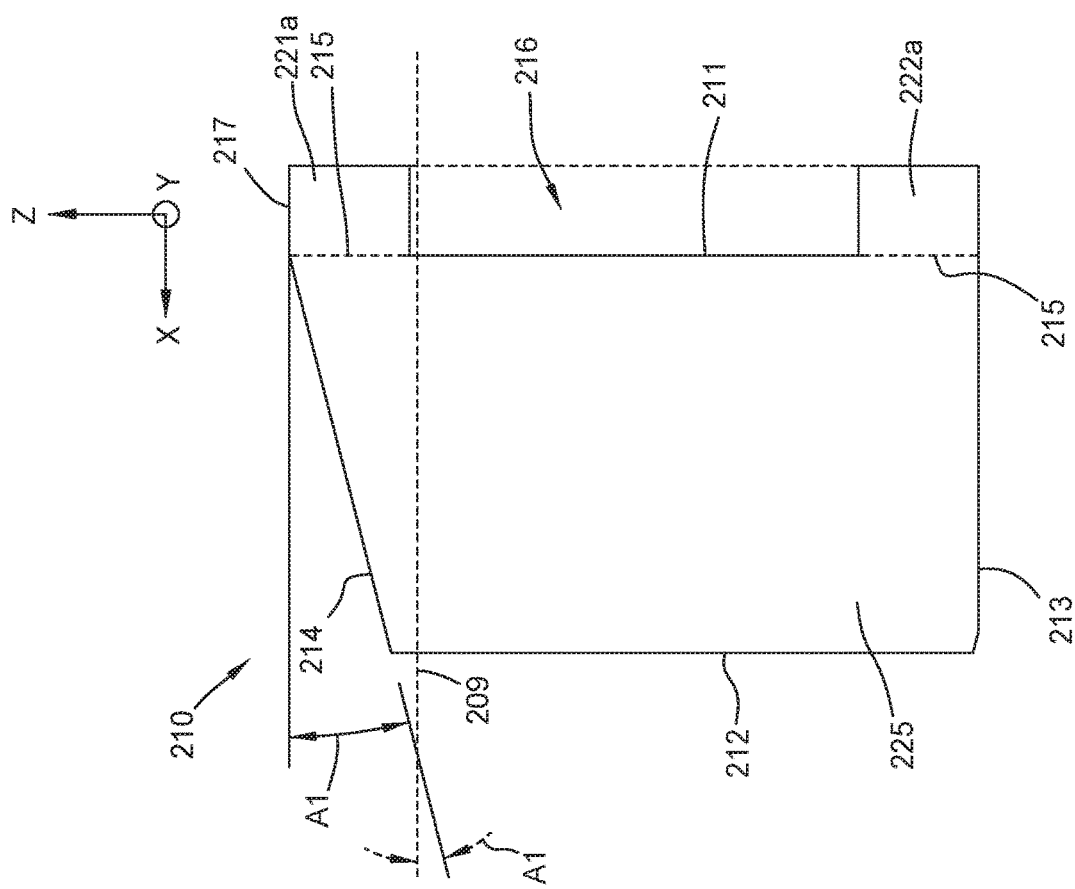
FIG. 2E illustrates a schematic side view of the first base body illustrated in FIG. 2A, according to one implementation.

FIG. 2E illustrates a schematic side view of the first base body 210 illustrated in FIG. 2A, according to one implementation. The first angled upper surface 214 is oriented at an angle A1. The angle A1 is from −2.0 degrees to less than 0.0 degrees or from greater than 0.0 degrees to 5.0 degrees. The angle A1 may be positive such that the first angled upper surface 214 tapers toward the first lower surface 213 in the direction D1. The angle A1 may be negative such that the first angled upper surface 214 tapers away from the first lower surface 213 in the direction D1.

In one embodiment, which can be combined with other embodiments, the first angled upper surface 214 is oriented at the angle A1 relative to the first horizontal upper surface 217 such that the angle A1 is measured between a profile of the first angled upper surface 214 and a profile of the first horizontal upper surface 217 (as shown in solid for the angle A1 in FIG. 2E). The first horizontal upper surface 217 is parallel to the X-Y plane.

In one embodiment (such as when the first horizontal upper surface 217 is omitted), which can be combined with other embodiments, the first angled upper surface 214 is oriented at the angle A1 relative to a horizontal plane 209 such that the angle A1 is measured between the profile of the first angled upper surface 214 and a profile of the horizontal plane 209 (as shown in ghost for the angle A1 in FIG. 2E). The horizontal plane 209 extends horizontally through the first inward surface 211 and the first outward surface 212 of the first base body 210. The horizontal plane 209 is parallel to the X-Y plane.

The angle A1 of the first angled upper surface 214 facilitates control of track pitch using the first and second write and read heads 218, 268, and modularity in applications of the base 201 across tape head arrangements, wires processes, and coupling processes. The angle A1 also facilitates effective and efficient reading operations and writing operations for the tape head 200.

The present disclosure contemplates that the first base body 210 as described may be also used as the second base body 260 in place of the second base body 260. As an example, the second angled upper surface 264 may be oriented at the angle A1. In one embodiment, which can be combined with other embodiments, the angle of orientation of the second angled upper surface 264 is equal to the angle of orientation of the first angled upper surface 214.

FIG. 2F illustrates a schematic top view of the first base body 210 illustrated in FIG. 2A, according to one implementation.

Figure 2H:
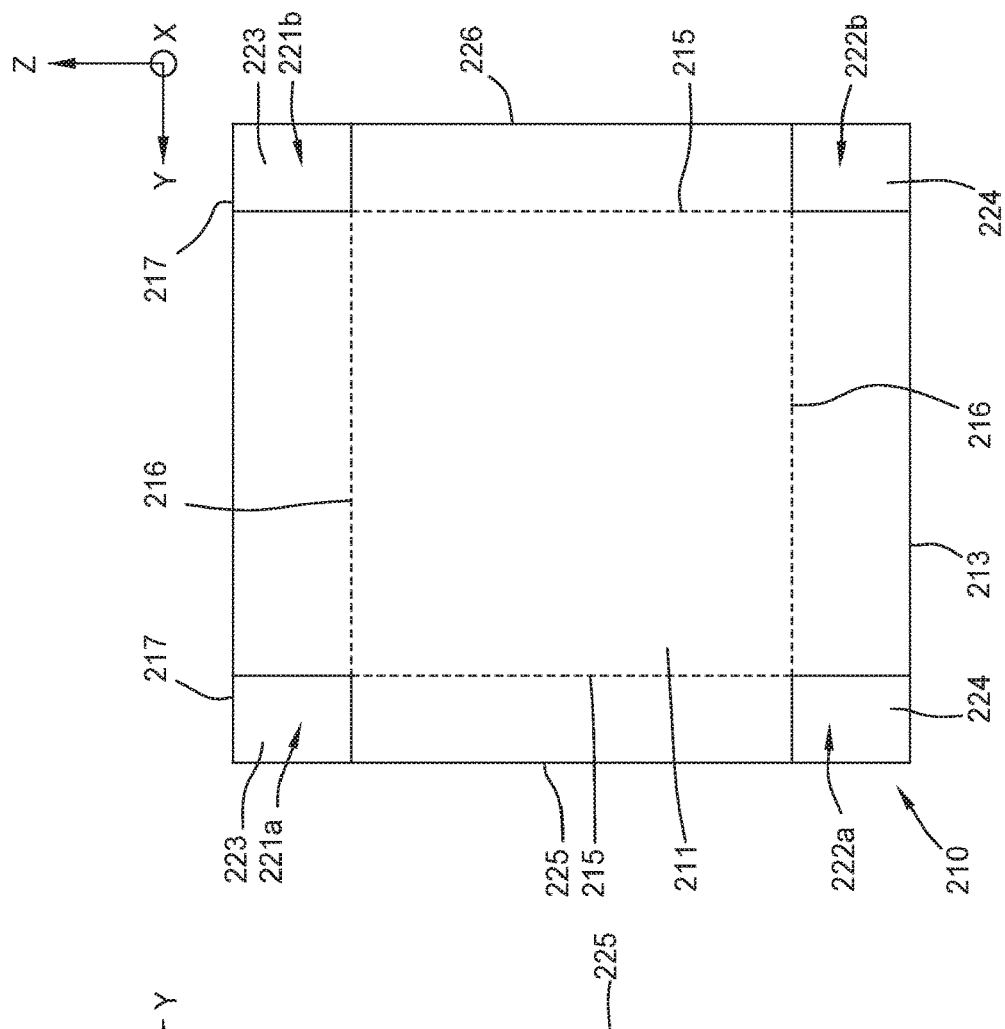
FIG. 2H illustrates a schematic front view of the first base body illustrated in FIG. 2A, according to one implementation.
Figure 2G:
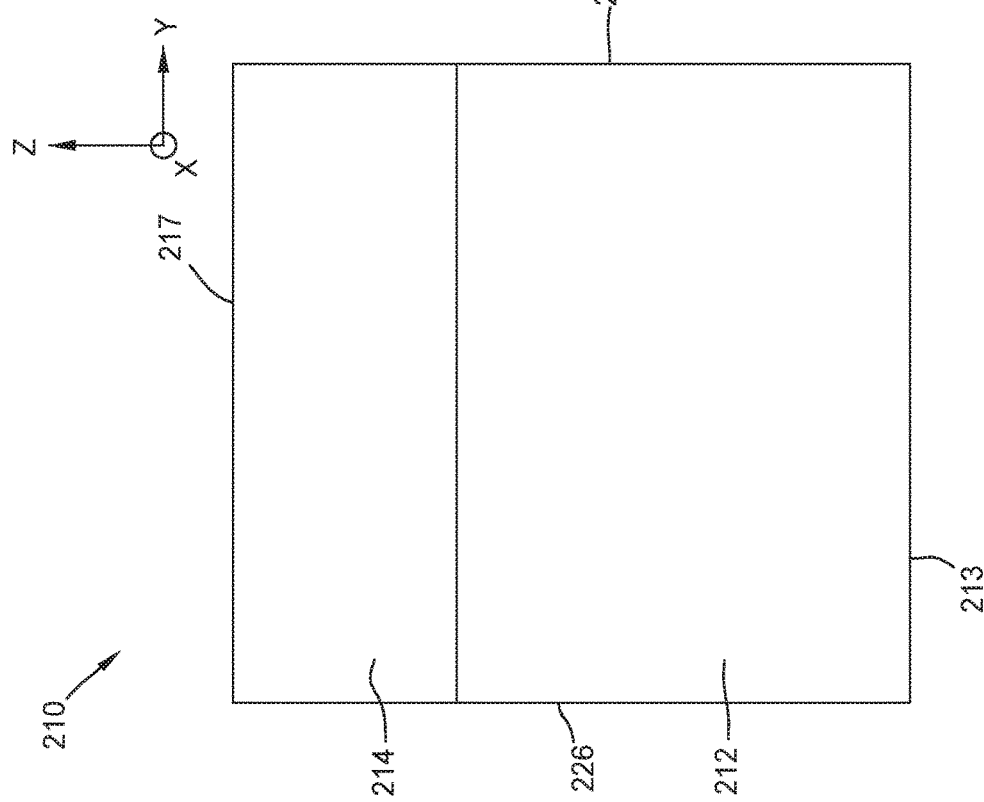
FIG. 2G illustrates a schematic back view of the first base body illustrated in FIG. 2A, according to one implementation.

FIG. 2G illustrates a schematic back view of the first base body 210 illustrated in FIG. 2A, according to one implementation. The back view shown in FIG. 2G faces the first outward surface 212.

FIG. 2H illustrates a schematic front view of the first base body 210 illustrated in FIG. 2A, according to one implementation. The front view shown in FIG. 2H faces the first inward surface 211. The first vertical opening 215 extending vertically and parallel to the Z-axis and the horizontal opening 216 extending horizontally and parallel to the Y-axis intersect each other perpendicularly to form a cross shape. The first inward surface 211 is defined by the first vertical opening 215 and the horizontal opening 216. The first inward surface 211 is in a cross shape.

Figure 3A:
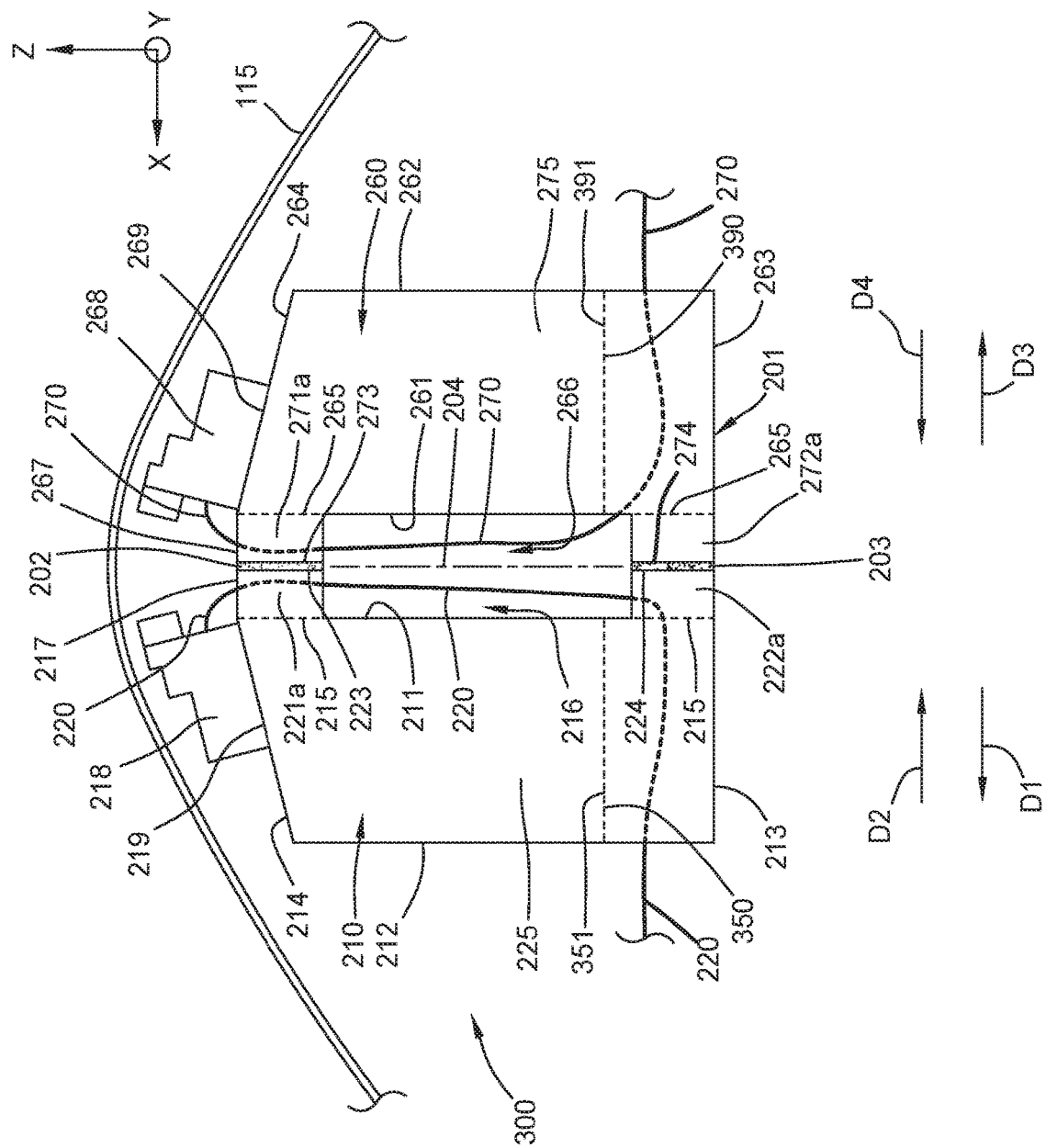
FIG. 3A illustrates a schematic side view of a tape head, according to one implementation.

FIG. 3A illustrates a schematic side view of a tape head 300, according to one implementation. The tape head 300 is used as at least part of a head assembly of a storage device, such as the head assembly 130 of the tape embedded drive 100 illustrated in FIGS. 1A-1C.

The tape head 300 is similar to the tape head 200 illustrated in FIG. 2A, and includes one or more of the same features, aspects, components, and/or properties thereof.

The first base body 210 includes a horizontal opening 350 extending horizontally and parallel to the X-axis. The horizontal opening 350 extends between the first inward surface 211 and the first outward surface 212. The horizontal opening 350 extends upward in a direction parallel to the Z-axis and extends at least partially into the first lower surface 213 to define a first recessed lower surface 351 of the first base body 210. The first recessed lower surface 351 is between the first lower surface 213 and the upper surface of the first base body 210 that is the first horizontal upper surface 217 and/or the first angled upper surface 214. The horizontal opening 350 and the first vertical opening 215 intersect each other perpendicularly at the first inward surface 211.

The first plurality of wires 220 extend from the first write and read head 218, partially through the first vertical opening 215, and through the horizontal opening 350 and past the first outward surface 212.

The second base body 260 includes a horizontal opening 390 extending horizontally and parallel to the X-axis. The horizontal opening 390 extends between the second inward surface 261 and the second outward surface 262. The horizontal opening 390 extends upward in a direction parallel to the Z-axis and extends at least partially into the second lower surface 263 to define a second recessed lower surface 391 of the second base body 260. The second recessed lower surface 361 is between the second lower surface 263 and the upper surface of the second base body 260 that is the second horizontal upper surface 267 and/or the second angled upper surface 264. The horizontal opening 390 and the second vertical opening 265 intersect each other perpendicularly at the second inward surface 261.

The second plurality of wires 270 extend from the second write and read head 268, partially through the second vertical opening 265, and through the horizontal opening 390 and past the second outward surface 262.

Figure 3B:
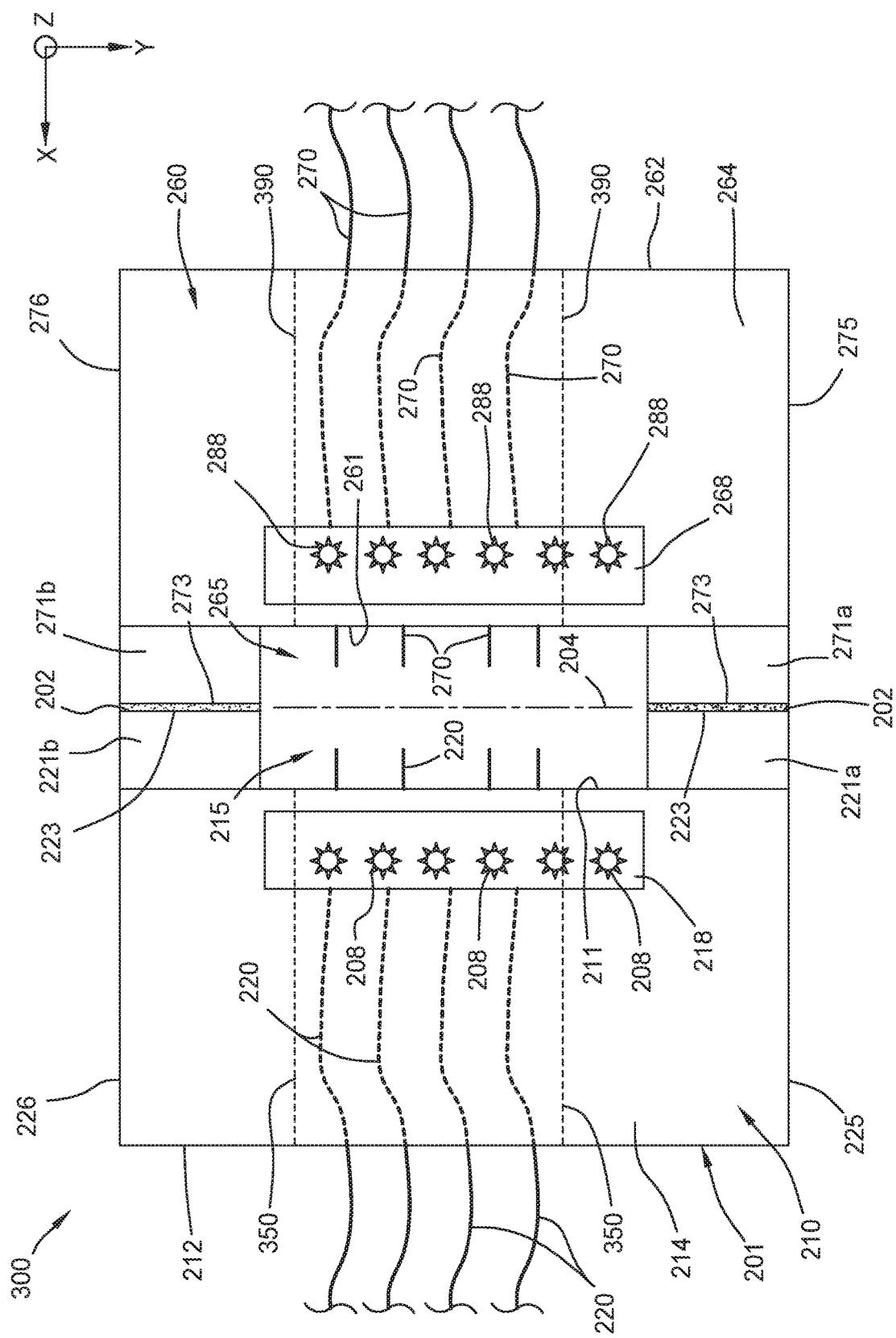
FIG. 3B illustrates a schematic top view of the tape head illustrated in FIG. 3A, according to one implementation.

FIG. 3B illustrates a schematic top view of the tape head 300 illustrated in FIG. 3A, according to one implementation. Aspects of the first and second write and read heads 218, 268 are not shown in FIG. 3B.

Figure 3D:
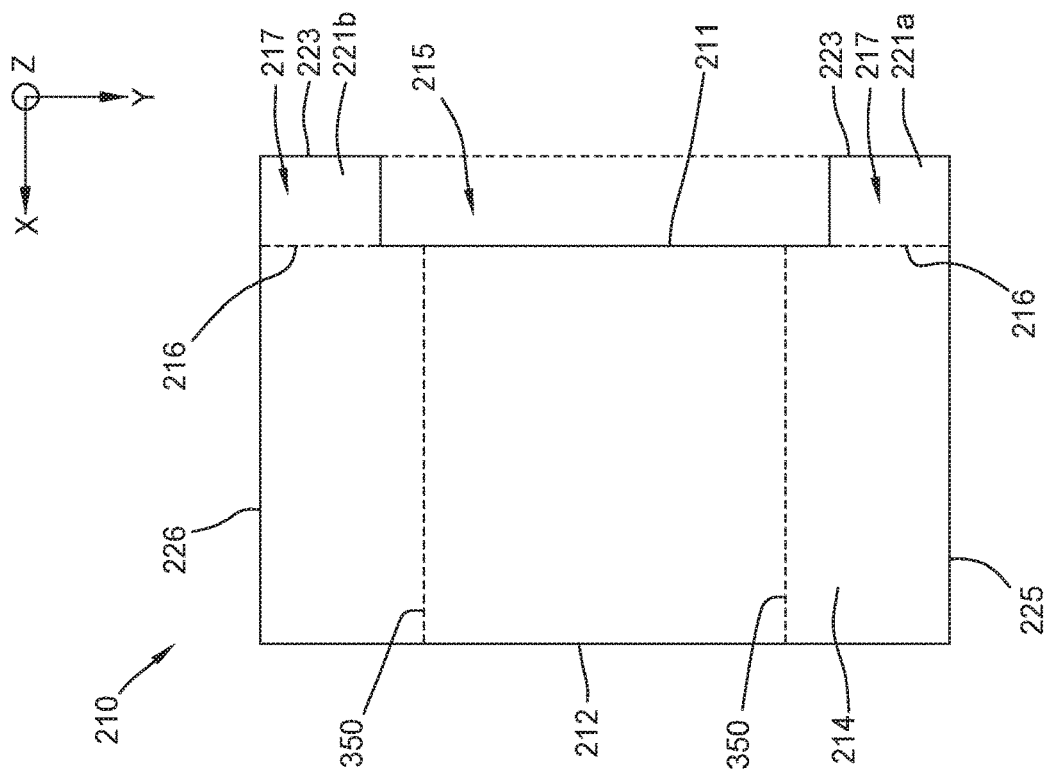
FIG. 3D illustrates a schematic top view of the first base body illustrated in FIG. 3A, according to one implementation.
Figure 3C:
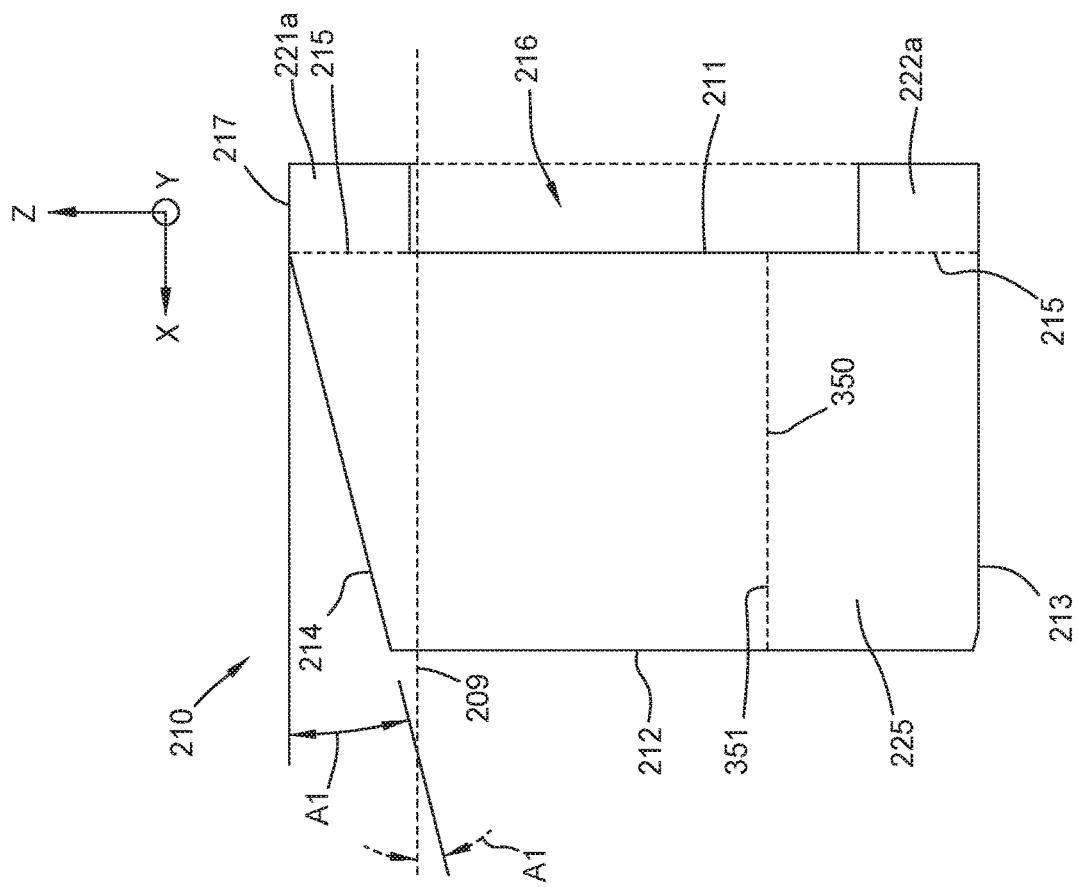
FIG. 3C illustrates a schematic side view of the first base body illustrated in FIG. 3A, according to one implementation.

FIG. 3C illustrates a schematic side view of the first base body 210 illustrated in FIG. 3A, according to one implementation. The first base body 210 shown in FIG. 3C is similar to the first base body 210 illustrated in FIG. 2E, and includes one or more of the same aspects, features, components, and/or properties thereof.

FIG. 3D illustrates a schematic top view of the first base body 210 illustrated in FIG. 3A, according to one implementation. The horizontal opening 350 is between and disposed at a gap from the first leg 222a and the second leg 222b of the lower set of legs 222a, 222b.

FIG. 3E illustrates a schematic back view of the first base body 210 illustrated in FIG. 3A, according to one implementation. The back view shown in FIG. 3E faces the first outward surface 212. The horizontal opening 350 is formed in the first lower surface 213 to define a first portion 213a and a second portion 213b of the first lower surface 213. The first portion 213a and the second portion 213b are separated by the horizontal opening 350. The horizontal opening 350 extends into the first lower surface 213 to define the first recessed lower surface 351 and a pair of vertical interior surfaces 352a, 352b separated by the horizontal opening 350. Each of the vertical interior surfaces 352a, 352b is oriented vertically and parallel to the X-Z plane. The vertical interior surfaces 352, 352b are disposed between the first side surface 225 and the second side surface 226.

The present disclosure contemplates that the first base body 210 as described may be also used as the second base body 260 in place of the second base body 260. As an example, the horizontal opening 390 of the second base body 260 may define a first portion and a second portion of the second lower surface 263, and a pair of vertical interior surfaces of the second base body 260.

FIG. 3F illustrates a schematic front view of the first base body 210 illustrated in FIG. 3A, according to one implementation. The front view shown in FIG. 3E faces the first inward surface 211. The horizontal opening 350 at least partially defines the first inward surface 211. The horizontal opening 350 extending parallel to the X-axis, the horizontal opening 216 extending parallel to the Y-axis, and the first vertical opening 215 extending parallel to the Z-axis define the first inward surface 211. The horizontal opening 350 removes a lower portion of the cross-shape of the first inward surface 211.

Benefits of the present disclosure include modularity in applications of tape head bases across tape head arrangements, wire arrangements, wire processes, and coupling processes; control of track pitch; optimized spacing between and around write and read heads of tape heads; effective and efficient reading operations and writing operations; effective manipulation and control of read elements, write elements, and servo elements in relation to tape media.

It is contemplated that one or more aspects disclosed herein may be combined. Moreover, it is contemplated that one or more aspects disclosed herein may include some or all of the aforementioned benefits. As an example, the first angled upper surface 214 and the second angled upper surface 264 facilitate control of track pitch using the first and second write and read heads 218, 268, and modularity in applications of the base 201 across tape head arrangements, wires processes, and coupling processes. The angle A1 also facilitates effective and efficient reading operations and writing operations for the tape head 200. The first and second base bodies 210, 260, the first and second vertical openings 215, 265, the horizontal openings 216, 266, and the horizontal openings 350, 390 also facilitate modularity, track control, and efficient and effective writing operations and reading operations.

In one embodiment, a base for write and read heads of magnetic drives comprises a base body formed of a ceramic material. The base body includes an inward surface, an outward surface opposing the inward surface, a lower surface, and an angled upper surface disposed above the lower surface. The angled upper surface is oriented at an angle, and the angle is from −2.0 degrees to less than 0.0 degrees or from greater than 0.0 degrees to 5.0 degrees. In one example, the base body also includes a horizontal upper surface adjacent the angled upper surface. The horizontal upper surface is parallel to the lower surface, and the angled upper surface is oriented at the angle relative to the horizontal upper surface. In one example, the angled upper surface is oriented at the angle relative to a horizontal plane that extends perpendicularly through the inward surface and the outward surface. In one example, the angled upper surface tapers toward the lower surface in a direction from the inward surface to the outward surface. A storage device including the base and a write and read head mounted on the angled upper surface is also disclosed.

In embodiment, a base for write and read heads of magnetic drives comprises a base body formed of a ceramic material. The base body includes an upper surface, a lower surface opposing the upper surface, and a vertical opening extending between the upper surface and the lower surface. The base body also includes an inward surface defined at least partially by the vertical opening, an outward surface opposing the inward surface, and a plurality of legs that protrude from the inward surface in a direction from the outward surface and to the inward surface. The plurality of legs include an upper set of legs that are at least part of the upper surface, and a lower set of legs that are at least part of the lower surface. The upper set of legs include two legs disposed on opposing sides of the vertical opening, and the lower set of legs include two legs disposed on opposing sides of the vertical opening. The base body also includes a first horizontal opening extending between the inward surface and the outward surface. The first horizontal opening extends at least partially into the lower surface to define a recessed lower surface that is between the upper surface and the lower surface. The first horizontal opening and the vertical opening intersect each other perpendicularly at the inward surface of the base body. The base body also includes a first side surface and a second side surface opposing the first side surface. The base body also includes a second horizontal opening extending between the first side surface and the second side surface to at least partially define the inward surface. A storage device including the base and a write and read head mounted on the base body is also disclosed.

In one embodiment, a storage device comprises an enclosure including a plurality of walls. The storage device also includes a first motor disposed in the enclosure, a second motor disposed in the enclosure, and a head assembly disposed in the enclosure. The head assembly includes a base. The base includes a first inward surface, a first outward surface opposing the first inward surface, a first lower surface, and a first angled upper surface disposed above the first lower surface. The base also includes a second inward surface, a second outward surface opposing the second inward surface, and a second angled upper surface. The head assembly includes a first write and read head mounted on the first angled upper surface in a write-read configuration, and a second write and read head mounted on the second angled upper surface in a read-write configuration. The head assembly also includes a first plurality of wires coupled to the first write and read head, and the base also includes a first vertical opening that at least partially defines the first inward surface. In one example, the first plurality of wires extend from the first write and read head and through the first vertical opening. The base also includes a first horizontal opening extending between the first inward surface and the first outward surface. The first horizontal opening extends at least partially into the lower surface to define a first recessed lower surface that is between the first upper surface and the lower surface. In one example, the first plurality of wires extend from the first write and read head, partially through the first vertical opening, and through the first horizontal opening. The base also includes an upper set of legs extending between the first inward surface and the second inward surface, and a lower set of legs extending between the first inward surface and the second inward surface. In one example, the base is formed of a single base body. In one example, the base includes a first base body that includes the first inward surface, the first outward surface, the first lower surface, and the first angled upper surface; and the base includes a second base body that includes the second inward surface, the second outward surface, the second angled upper surface, and a second lower surface disposed below the second angled upper surface. The first base body is bonded to the second base body.

While the foregoing is directed to embodiments of the present disclosure, other and further embodiments of the disclosure may be devised without departing from the basic scope thereof, and the scope thereof is determined by the claims that follow.

What is claimed is:

1. A storage device comprising:
 a base comprising a base body formed of a ceramic material, the base body comprising:
  an inward surface,
  an outward surface opposing the inward surface,
  a lower surface, and
  an angled upper surface disposed above the lower surface; and
 a write and read head mounted on the angled upper surface.

2. The storage device of claim 1, wherein the angled upper surface is oriented at an angle, and the angle is from −2.0 degrees to less than 0.0 degrees or from greater than 0.0 degrees to 5.0 degrees.

3. The storage device of claim 2, wherein the base body further comprises a horizontal upper surface adjacent the angled upper surface, the horizontal upper surface is parallel to the lower surface, and the angled upper surface is oriented at the angle relative to the horizontal upper surface.

4. The storage device of claim 2, wherein the angled upper surface is oriented at the angle relative to a horizontal plane that extends perpendicularly through the inward surface and the outward surface.

5. The storage device of claim 1, wherein the angled upper surface tapers toward the lower surface in a direction from the inward surface to the outward surface.

6. A base for write and read heads of magnetic drives, the base comprising:
 a base body formed of a ceramic material, the base body comprising:
  an uppermost outer surface,
  a lowermost outer surface opposing the uppermost outer surface,
  a vertical opening extending between and up to the uppermost outer surface and the lowermost outer surface,
  an inward surface defined at least partially by the vertical opening,
  an outward surface opposing the inward surface,
  a plurality of legs that protrude from the inward surface in a direction from the outward surface and to the inward surface.

7. The base of claim 6, wherein the plurality of legs comprise an upper set of legs that are at least part of the uppermost outer surface, and a lower set of legs that are at least part of the lowermost outer surface.

8. The base of claim 7, wherein the upper set of legs comprises two legs disposed on opposing sides of the vertical opening, and the lower set of legs comprises two legs disposed on opposing sides of the vertical opening.

9. The base of claim 6, wherein the base body further comprises a first horizontal opening extending between the inward surface and the outward surface, the first horizontal opening extending at least partially into the lowermost outer surface to define a recessed lower surface that is between the uppermost outer surface and the lowermost outer surface.

10. The base of claim 9, wherein the first horizontal opening and the vertical opening intersect each other perpendicularly at the inward surface of the base body.

11. The base of claim 9, wherein the base body further comprises a first side surface and a second side surface opposing the first side surface, and the base body further comprises a second horizontal opening extending between the first side surface and the second side surface to at least partially define the inward surface.

12. A storage device comprising the base of claim 6 and a write and read head mounted on the base body.

13. A storage device, comprising:
 a first motor;
 a second motor; and
 a head assembly comprising:
  a base comprising:
   a first inward surface,
   a first outward surface opposing the first inward surface,
   a first lower surface,
   a first angled upper surface disposed above the first lower surface,
   a second inward surface,
   a second outward surface opposing the second inward surface, and
   a second angled upper surface,
  a first write and read head mounted on the first angled upper surface in a write-read configuration, and
  a second write and read head mounted on the second angled upper surface in a read-write configuration.

14. The storage device of claim 13, wherein the head assembly further comprises a first plurality of wires coupled to the first write and read head, and the base further comprises a first vertical opening that at least partially defines the first inward surface, wherein the first plurality of wires extend from the first write and read head and through the first vertical opening.

15. The storage device of claim 14, wherein the base further comprises a first horizontal opening extending between the first inward surface and the first outward surface, the first horizontal opening extending at least partially into the first lower surface to define a first recessed lower surface that is between the first angled upper surface and the first lower surface, wherein the first plurality of wires extend from the first write and read head, partially through the first vertical opening, and through the first horizontal opening.

16. The storage device of claim 13, wherein the base further comprises an upper set of legs extending between the first inward surface and the second inward surface, and a lower set of legs extending between the first inward surface and the second inward surface.

17. The storage device of claim 16, wherein the base is formed of a single base body.

18. The storage device of claim 16, wherein:
 the base comprises a first base body that comprises the first inward surface, the first outward surface, the first lower surface, and the first angled upper surface;
 the base comprises a second base body that comprises the second inward surface, the second outward surface, the second angled upper surface, and a second lower surface disposed below the second angled upper surface; and
 the first base body is bonded to the second base body.

19. A base for write and read heads of magnetic drives, the base comprising:
 a base body formed of a ceramic material, the base body comprising:
  an upper surface,
  a lower surface opposing the upper surface, a vertical opening extending between the upper surface and the lower surface,
an inward surface defined at least partially by the vertical opening,
an outward surface opposing the inward surface,
a plurality of legs that protrude from the inward surface in a direction from the outward surface and to the inward surface, the plurality of legs comprising an upper set of legs that are at least part of the upper surface, and a lower set of legs that are at least part of the lower surface.

20. The base of claim 19, wherein the upper set of legs comprises two legs disposed on opposing sides of the vertical opening, and the lower set of legs comprises two legs disposed on opposing sides of the vertical opening.

21. A base for write and read heads of magnetic drives, the base comprising:
a base body formed of a ceramic material, the base body comprising:
an upper surface,
a lower surface opposing the upper surface,
a vertical opening extending between the upper surface and the lower surface,
an inward surface defined at least partially by the vertical opening,
an outward surface opposing the inward surface,
a plurality of legs that protrude from the inward surface in a direction from the outward surface and to the inward surface, and
a first horizontal opening extending between the inward surface and the outward surface, the first horizontal opening extending at least partially into the lower surface to define a recessed lower surface that is between the upper surface and the lower surface.

22. The base of claim 21, wherein the first horizontal opening and the vertical opening intersect each other perpendicularly at the inward surface of the base body.

23. The base of claim 21, wherein the base body further comprises a first side surface and a second side surface opposing the first side surface, and the base body further comprises a second horizontal opening extending between the first side surface and the second side surface to at least partially define the inward surface.

24. A storage device, comprising:
an enclosure comprising a plurality of walls;
a first motor disposed in the enclosure;
a second motor disposed in the enclosure; and
a head assembly disposed in the enclosure, the head assembly comprising:
a base, the base comprising:
a first inward surface,
a first outward surface opposing the first inward surface,
a first lower surface,
a first angled upper surface disposed above the first lower surface,
a second inward surface,
a second outward surface opposing the second inward surface, and
a second angled upper surface,
a first write and read head mounted on the first angled upper surface in a write-read configuration, and
a second write and read head mounted on the second angled upper surface in a read-write configuration.

25. The storage device of claim 24, wherein the head assembly further comprises a first plurality of wires coupled to the first write and read head, and the base further comprises a first vertical opening that at least partially defines the first inward surface, wherein the first plurality of wires extend from the first write and read head and through the first vertical opening.

26. The storage device of claim 25, wherein the base further comprises a first horizontal opening extending between the first inward surface and the first outward surface, the first horizontal opening extending at least partially into the first lower surface to define a first recessed lower surface that is between the first angled upper surface and the first lower surface, wherein the first plurality of wires extend from the first write and read head, partially through the first vertical opening, and through the first horizontal opening.

27. A storage device, comprising:
an enclosure comprising a plurality of walls;
a first motor disposed in the enclosure;
a second motor disposed in the enclosure; and
a head assembly disposed in the enclosure, the head assembly comprising a base, and the base comprising:
a first inward surface,
a first outward surface opposing the first inward surface,
a first lower surface,
a first angled upper surface disposed above the first lower surface,
a second inward surface,
a second outward surface opposing the second inward surface, and
a second angled upper surface,
an upper set of legs extending between the first inward surface and the second inward surface, and
a lower set of legs extending between the first inward surface and the second inward surface.

28. The storage device of claim 27, wherein the base is formed of a single base body.

29. The storage device of claim 27, wherein:
the base comprises a first base body that comprises the first inward surface, the first outward surface, the first lower surface, and the first angled upper surface;
the base comprises a second base body that comprises the second inward surface, the second outward surface, the second angled upper surface, and a second lower surface disposed below the second angled upper surface; and
the first base body is bonded to the second base body.

* * * * *